United States Patent [19]

Smith

[11] 4,005,897
[45] Feb. 1, 1977

[54] FISH CLAW
[75] Inventor: Joel E. Smith, Reidsville, Ga.
[73] Assignee: Joel E. Smith, Reidsville, Ga.
[22] Filed: July 21, 1975
[21] Appl. No.: 597,365
[52] U.S. Cl. .............................................. 294/115
[51] Int. Cl.² ........................................ A01K 97/14
[58] Field of Search ............. 294/11, 19 R, 22, 26, 294/50.6, 50.8, 50.9, 100, 110 A, 115, 117; 43/5; 119/154

[56] References Cited

UNITED STATES PATENTS

| 652,077 | 6/1900 | Burson | 294/50.8 |
|---|---|---|---|
| 682,021 | 9/1901 | Bennett | 294/115 X |
| 1,018,065 | 2/1912 | Marble | 294/100 |
| 1,415,143 | 5/1922 | Briddell | 294/115 |
| 1,489,581 | 4/1924 | Lynch | 294/100 |
| 2,420,980 | 5/1947 | Reise | 294/115 |
| 2,852,302 | 9/1958 | Steffen | 294/117 |

*Primary Examiner*—Johnny D. Cherry
*Attorney, Agent, or Firm*—McNenny, Pearne, Gordon, Gail, Dickinson & Schiller

[57] ABSTRACT

A fish claw for landing or boating a fish having an elongated shank body on a forward end of which are pivotally mounted a pair of opposed jaws. A pair of control rods, symmetrically disposed on opposite sides of the shank body, are operably connected at their forward ends to the pivotal jaws and are arranged at their rearward ends to support and guide an actuating hand grip. Means connecting the control rods and jaws is arranged to provide maximum gripping force when the jaws are in or near their open position and the jaws are arranged to overlap in their closed position.

1 Claim, 2 Drawing Figures

FISH CLAW

BACKGROUND OF THE INVENTION

The invention relates to improvements in hand operated gripping implements and in particular to fish gaffs or claws for landing or boating a fish.

PRIOR ART

Fish claws of the type to which the present invention pertains are used to grasp and raise from the water fish caught with hook and line tackle. Such fish claws may be used in preference to nets or gaff hooks which may be considered to lack a requisite level of reliability and positive control over a hooked fish so as to risk loss of the fish. Prior fish claws or gaffs may be catagorized as the trip spring type in which jaws are snapped shut by a spring released by contact of a fish with a trip element in the throat of the jaws and the hand operated type in which a handle is manually manipulated to cause the jaws to close.

U.S. Patents directed to devices for landing fish and handling other articles are shown, for example, in U.S. Pat. No. 886,003 to Kraft; U.S. Pat. No. 1,377,933 to Sheatsley; U.S. Pat. No. 2,199,300 to Beletic; U.S. Pat. No. 2,852,302 to Steffen; U.S. Pat. No. 2,930,648 to Allan.

SUMMARY OF THE INVENTION

The present invention is directed to a hand closed fish claw device having a simplified construction assuring ease and reliability in operation and being adaptable to manufacture at low cost. The device includes an elongated body or shank on one end of which is pivotally mounted a pair of opposed jaws remotely operated by a hand grip at an opposite end of the body. In accordance with the invention, the jaws are controlled by a pair of flat control rods connected between the jaws and hand grip and symmetrically disposed on opposite sides of the main body. The symmetrical arrangement of the rods assures that forces within the device are balanced so that undesirable flexing or binding of the movable elements is avoided. Further, the control rods are arranged as the sole support and means for guiding the hand grip in translational movement, thereby avoiding critical alignment problems which would otherwise exist where the support and guiding functions were provided by independent means.

In accordance with another important feature of the invention, the various elements of the device are arranged with a geometry which provides maximum gripping force for a given manual effort at the fully opened jaw position so that the gripping force is suited to the size of the fish being handled. The device is so constructed and arranged that it may be fabricated primarily from flat metal stock with a minimum investment in tooling and with a minimum of machining or other fabricating steps. These and other objects and advantages of the invention will hereinafter become more fully apparent from the following description of the drawing illustrating a presently preferred embodiment thereof.

DESCRIPTION OF THE PREFERRED EMBODIMENT

Figure 1:
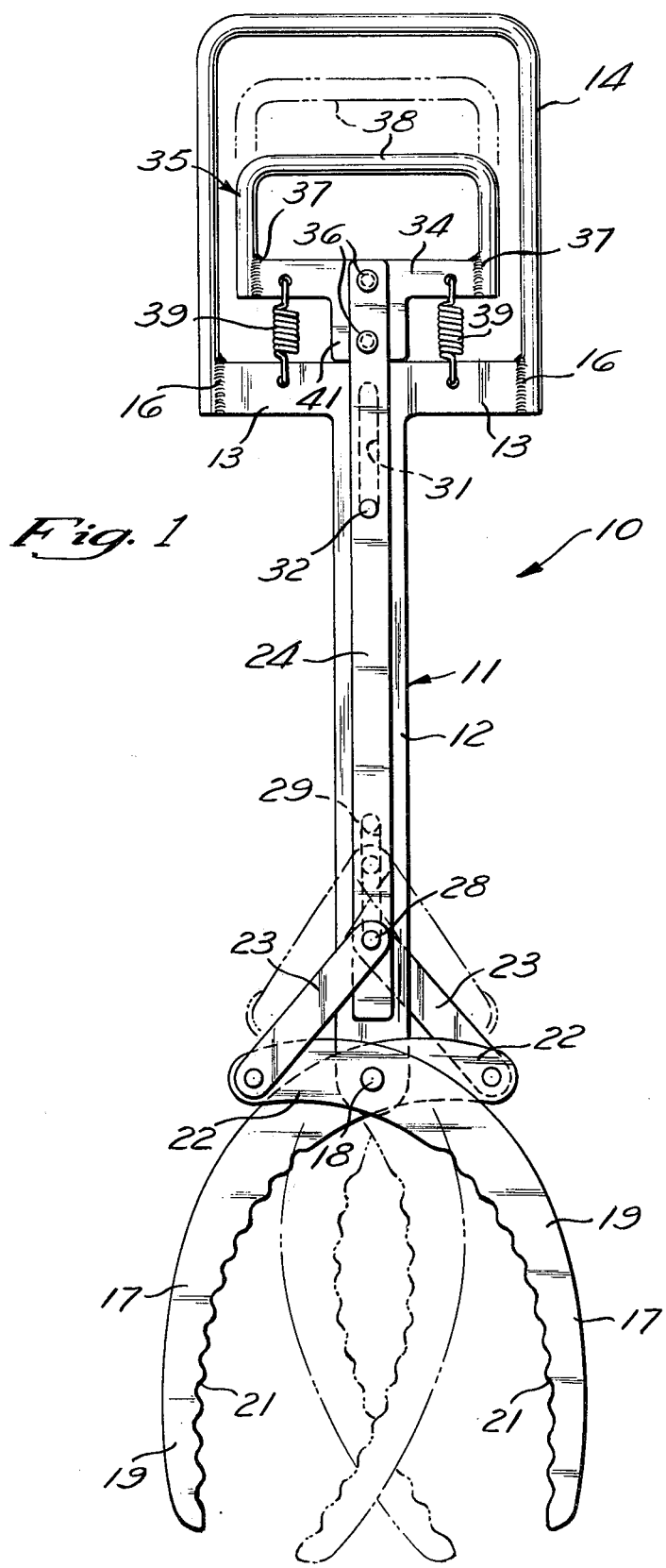
FIG. 1 is a plan view of the fish claw device of the invention.
Figure 2:
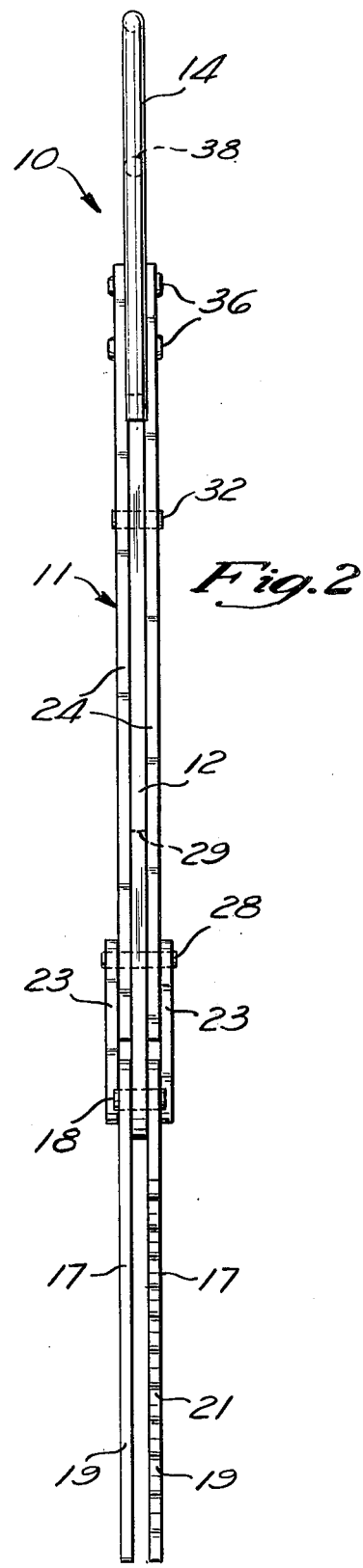
FIG. 2 is a side view of the fish claw device.

Referring now to the Figures, there is shown a fish claw device 10. The various elements of the device 10 are conveniently formed of steel or other suitable structural material. The device 10 is provided with a main frame or body 11 stamped or otherwise formed of flat steel stock. The body 11 includes an elongated shank 12 having at its rearward end integral transverse extensions 13 supporting a U-shaped handle 14. The handle 14 is fixed to the extensions 13 by welded joints 16 or other suitable means. The handle 14 is conveniently fabricated of round bar stock or tubing bent into the illustrated shape.

At an end of the shank 12 opposite the handle 14 are pivotally mounted arcuate jaws 17 by means of a pin 18. The jaws 17 are substantially indentical and are stamped or otherwise made from flat stock. Each jaw 14 includes a gripping portion 19 extending generally forwardly of the pin 18 and a serrated inner edge 21 adapted to engage a fish. A second portion 22 of each jaw extending generally at a right angle to the main length of the forward jaw portion 19 provides a moment or lever arm, the distal end of which is pivotally connected to an associated link 23. The links 23 are each connected at their rearward ends to an adjacent one of a pair of longitudinally extending control rods 24. A single pin or rivet 28 extends through each of the links 23 and control rods 24 and an elongated longitudinally extending slot 29 in the shank 12. A similar elongated slot 31 is formed in the handle end of the shank 12 to permit movement therethrough of a pin 32 pressed or otherwise secured in suitable holes in the control rods 24. The control rods 24 are thereby guided in their respective planes for movement parallel to the shank 12 by sliding engagement of the pins 28 and 32 in their respective slots 29 and 31. The pins 28 and 32 are assembled with and suitably retain the control rods 24 with sufficient clearance between the inner faces of the control rods and outer surfaces of the shank 12 for free relative sliding movement along the direction of the shank 12.

A T-shaped portion of a hand grip 35 is interposed between the rearward ends of the control rods 24 as a spacer and is fixed therebetween by a pair of rivets 36. Like the shank 11, the T-shaped element 34 is stamped or otherwise fabricated of sheet stock and is joined as by welding at 37 to a U-shaped round tube or bar 38. The hand grip 35 is thereby supported and guided for longitudinal movement solely by the control rods 24. A pair of identical tension springs, symmetrically arranged with respect to the line of action of the control rods 24, are hooked to suitable holes in the extensions 13 and element 34 to bias the hand grip 35 forwardly and normally maintain a stem portion 41 of the T-shaped hand grip element 34 in contact with a rear face of the shank 12. Since the guiding and supporting functions are exclusively provided by the control rods 24 there is no tendency for the hand grip to bind or otherwise present difficulties in operation due to misalignment.

Use of the device 10 should be self-evident from the foregoing description. The device may be manipulated and controlled by one hand by grasping the handle 14 and hand grip 35 between the palm and fingers, respectively. By drawing the fingers toward the palm, the hand grip 35 is caused to move rearwardly toward the phantom position illustrated in FIG. 1. Such rearward motion of the hand grip 35 causes retraction of the control rods 24 and rearward displacement of the links 23. In the manner of a bell crank, the jaws 17 are pivotally closed as the retraction force on the links 23 is transmitted to the lever arm portions 22 of the jaws.

The geometry of the links 23 and lever arms 22 is arranged to provide a maximum closing force for given tension on the hand grip 35 when the jaws are in or near the fully opened position illustrated in full line FIG. 1. This permits maximum holding force to be applied when gripping a large fish. The jaws are mounted in offset relation to each other by the thickness of the shank 12 so that they are capable of overlapping in the fully closed position as illustrated in phantom in FIG. 1. The symmetrical arrangement of the control rods 24 on either side of the shank avoids unbalanced forces in these elements which would otherwise cause flexing and consequent faulty action through binding of abutting surfaces. The jaws are returned to the open position by the biasing force of the springs 39 upon release of the hand grip 35. The length of the device advantageously extends the natural reach of the user to enable him to readily land or boat a fish otherwise beyond his reach.

Although the present invention has been illustrated herein with reference to a particular, presently preferred embodiment thereof, it will be appreciated that it is not restricted to the slavish imitation of each and every detail set forth herein. Obviously, numerous variations thereof may be made without departing from the scope of the invention as defined in the appended claims.

What is claimed is:

1. A hand-operated device for handling a captured fish comprising an elongated flat shank, a pair of opposed jaws pivotally mounted at a common point on a forward end of the shank, the jaws each having a main gripping portion extending generally forwardly of the pivot point and an integral lever arm extending parallel to the plane of the shank generally transversely of the forward gripping portion, said jaws being mounted on opposite sides of the shank, each in abutting contact with the adjacent face of the shank, a pair of flat control rods on opposite sides of the shank, said control rods each being in abutting contact with an adjacent face of the shank and being coplanar with an associated jaw, a flat link pivotally connected between the forward end of each control rod and the distal end of the adjacent jaw lever arm, each link being disposed in a plane overlying the plane of the associated jaw and control rod, a hand grip carried on the rearward ends of the control rods, said hand grip including a portion interposed between the rearward control rod ends and coplanar with the shank, a pair of longitudinally spaced pins retaining said control rods in fixed relation therebetween with a clearance spacing permitting said control rods to slide longitudinally of the shank, said shank having a pair of spaced longitudinal slots for movement of said pins during movement of said control rods, a forward one of said pins providing the pivotal connection of said links to their associated control rods, a pair of tension springs connected between said hand grip and said shank and symmetrically spaced about the line of movement of said control rods, said springs biasing said jaws to their open position, a portion of said hand grip being in abutting engagement with said shank when said jaws are in their open position, the main gripping portion of said jaws having an arcuate configuration and being arranged to overlap when said jaws are closed.

* * * * *